US 6,685,312 B2

(12) United States Patent
Klinefelter et al.

(10) Patent No.: US 6,685,312 B2
(45) Date of Patent: Feb. 3, 2004

(54) INK JET CARD PRINTER

(75) Inventors: Gary M. Klinefelter, Eden Prairie, MN (US); Kathleen Phillips, St. Louis Park, MN (US); Martin A. Pribula, Eden Prairie, MN (US); Jeffrey D. Upin, Edina, MN (US); Gary A. Lenz, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/866,309

(22) Filed: May 25, 2001

(65) Prior Publication Data

US 2001/0024228 A1 Sep. 27, 2001

Related U.S. Application Data

(63) Continuation-in-part of application No. 09/702,116, filed on Oct. 30, 2000, which is a continuation-in-part of application No. 09/178,455, filed on Oct. 23, 1998, now Pat. No. 6,264,296.
(60) Provisional application No. 60/207,494, filed on May 26, 2000, and provisional application No. 60/063,043, filed on Oct. 24, 1997.

(51) Int. Cl.[7] .................................................. B41J 2/01
(52) U.S. Cl. ........................................................ 347/104
(58) Field of Search .............................. 347/4, 104, 90; 400/521–544, 636–641

(56) References Cited

U.S. PATENT DOCUMENTS

| 3,598,396 A | 8/1971 | Andrews et al. ............. 271/9 |
| 3,755,653 A | 8/1973 | Venker .................... 235/61.11 |
| 3,889,472 A | 6/1975 | Guillaud ..................... 60/698 |
| 3,960,072 A | 6/1976 | Ahlgren et al. ............. 101/35 |
| 4,015,839 A | 4/1977 | McKee ....................... 271/37 |
| 4,017,068 A | 4/1977 | McKee ...................... 271/275 |
| 4,031,578 A | 6/1977 | Holloran et al. ......... 340/172.5 |

(List continued on next page.)

FOREIGN PATENT DOCUMENTS

| EP | 0 562 979 | 9/1993 | |
| EP | 0 887 197 | 12/1998 | |
| EP | 0 979 736 | 2/2000 | |
| EP | 0 992 347 A2 | 4/2000 | |
| EP | 0 995 603 A2 | 4/2000 | |
| GB | 2 120 821 A | 12/1983 | |
| JP | 401-277837 A | 11/1989 | |
| JP | 406226995 A | * 8/1994 | ................. 347/90 |
| JP | 10337886 | 12/1998 | |
| JP | 411105359 A | 4/1999 | |

(List continued on next page.)

OTHER PUBLICATIONS

Streamfeeder—ST 1250 Universal Friction Feeder; last modified Feb. 27, 2000; 1 page with heading of "Streamfeeder—Product Index"; and 3 pages with heading of "Streamfeeder—ST 1250 Universal Friction Feeder".

(List continued on next page.)

Primary Examiner—Stephen D. Meier
Assistant Examiner—Julian D. Huffman
(74) Attorney, Agent, or Firm—Westman, Champlin & Kelly

(57) ABSTRACT

An ink jet card printer is disclosed that includes an ink jet printhead and a transport mechanism. The ink jet printhead is adapted to print on portions of a surface of a card that are presented in a print position along a print path. The transport mechanism includes at least one cantilevering mechanism that is positioned to a side of the print position along the print path. The cantilevering mechanism is adapted to unobstructively present the surface of the card to the printhead in the print position.

64 Claims, 9 Drawing Sheets

U.S. PATENT DOCUMENTS

| | | | |
|---|---|---|---|
| 4,068,028 A | 1/1978 | Samonides | 428/40 |
| 4,102,267 A | 7/1978 | Ritzerfeld | 101/132.5 |
| 4,146,900 A | 3/1979 | Arnold | 346/75 |
| 4,161,312 A | 7/1979 | Eckhardt et al. | 271/3 |
| 4,393,386 A | 7/1983 | Di Giulio | 346/75 |
| 4,534,313 A | 8/1985 | Louvel | 118/696 |
| 4,604,631 A | 8/1986 | Jinnai et al. | 346/1.1 |
| 4,617,080 A | 10/1986 | Kobayashi et al. | 156/359 |
| 4,650,350 A * | 3/1987 | Dorner | 400/120 |
| 4,680,596 A | 7/1987 | Logan | 346/140 |
| 4,685,702 A | 8/1987 | Kazuharu | 283/81 |
| 4,686,540 A | 8/1987 | Leslie et al. | 346/33 |
| 4,716,346 A | 12/1987 | Matsuo | 318/38 |
| 4,734,868 A | 3/1988 | DeLacy | 364/519 |
| 4,781,985 A | 11/1988 | Desjarlais | 428/421 |
| 4,782,363 A | 11/1988 | Britt et al. | 355/14 |
| 4,797,018 A | 1/1989 | Hofmann et al. | 400/208 |
| 4,845,490 A | 7/1989 | Ward et al. | 340/825.31 |
| 4,961,088 A | 10/1990 | Gilliland et al. | 355/206 |
| 4,972,476 A | 11/1990 | Nathans | 380/23 |
| 5,019,839 A | 5/1991 | Watanabe et al. | 346/134 |
| 5,068,005 A | 11/1991 | Lindskog et al. | 156/514 |
| 5,077,467 A | 12/1991 | Barron, Jr. et al. | 250/221 |
| 5,111,239 A | 5/1992 | Kamimura et al. | 355/45 |
| 5,138,344 A | 8/1992 | Ujita | 400/175 |
| 5,149,211 A | 9/1992 | Pettigrew | 400/88 |
| 5,161,233 A | 11/1992 | Matsuo et al. | 355/77 |
| 5,184,181 A | 2/1993 | Kurando et al. | 355/260 |
| 5,239,926 A | 8/1993 | Nubson et al. | 101/487 |
| 5,266,968 A | 11/1993 | Stephenson | 400/208 |
| 5,267,800 A | 12/1993 | Petterutl et al. | 400/88 |
| 5,277,501 A | 1/1994 | Tanaka et al. | 400/120 |
| 5,291,227 A * | 3/1994 | Suzuki | 347/104 |
| 5,318,370 A | 6/1994 | Nehowig | 400/207 |
| 5,327,278 A | 7/1994 | Coleman et al. | 355/278 |
| 5,368,677 A | 11/1994 | Ueda et al. | 156/362 |
| 5,410,136 A * | 4/1995 | McIntire et al. | 235/380 |
| 5,455,617 A | 10/1995 | Stephenson et al. | 400/207 |
| 5,466,319 A | 11/1995 | Zager et al. | 156/220 |
| 5,502,464 A | 3/1996 | Takahashi et al. | 346/25 |
| 5,516,218 A | 5/1996 | Amano et al. | 400/535 |
| 5,530,468 A | 6/1996 | Yoshimi et al. | 347/262 |
| 5,579,694 A | 12/1996 | Mailloux | 101/488 |
| 5,642,877 A | 7/1997 | Green | 271/35 |
| 5,646,388 A | 7/1997 | D'Entremont et al. | 235/380 |
| 5,695,589 A | 12/1997 | German et al. | 156/250 |
| 5,703,347 A | 12/1997 | Reddersen et al. | 235/472 |
| 5,707,162 A | 1/1998 | Kasal et al. | 400/692 |
| 5,709,484 A * | 1/1998 | Dorner | 400/188 |
| 5,755,519 A | 5/1998 | Klinefelter | 400/249 |
| 5,772,199 A | 6/1998 | Green | 271/10.06 |
| 5,806,999 A * | 9/1998 | Kobayashi | 400/188 |
| 5,808,646 A * | 9/1998 | Kitahara et al. | 347/104 |
| 5,820,281 A | 10/1998 | Hill et al. | 400/621 |
| 5,837,991 A | 11/1998 | LaManna et al. | 235/475 |
| 5,882,127 A | 3/1999 | Amano | 400/521 |
| 5,936,008 A | 8/1999 | Jones et al. | 523/161 |
| 5,978,621 A | 11/1999 | Glemser et al. | 399/90 |
| 5,980,011 A | 11/1999 | Cummins et al. | 347/4 |
| 5,995,774 A | 11/1999 | Applegate et al. | 399/27 |
| 6,011,741 A | 1/2000 | Wallace et al. | 365/221 |
| 6,037,879 A | 3/2000 | Tuttle | 340/825.54 |
| 6,039,430 A | 3/2000 | Helterline et al. | 347/19 |
| 6,071,024 A | 6/2000 | Chi-Ming et al. | 347/177 |
| 6,072,402 A | 6/2000 | Kniffin et al. | 340/825 |
| 6,076,913 A | 6/2000 | Garcia et al. | 347/19 |
| 6,099,101 A | 8/2000 | Maurelli et al. | 347/7 |
| 6,099,178 A | 8/2000 | Spurr et al. | 400/207 |
| 6,113,208 A | 9/2000 | Benjamin et al. | 347/7 |
| 6,163,658 A | 12/2000 | Suzuki | 399/12 |
| 6,179,401 B1 | 1/2001 | Stephens, Jr. et al. | 347/19 |
| 6,213,392 B1 | 4/2001 | Zuppicich | 235/380 |
| 6,236,420 B1 * | 5/2001 | Matsuzaka | 347/170 |
| 6,252,791 B1 | 6/2001 | Wallace et al. | 365/221 |
| 6,253,329 B1 | 6/2001 | Kang | 713/300 |
| 6,263,170 B1 | 7/2001 | Bortnem | 399/13 |
| 6,264,296 B1 | 7/2001 | Klinefelter et al. | 347/4 |
| 6,264,301 B1 | 7/2001 | Helterline et al. | 347/19 |
| 6,267,463 B1 | 7/2001 | Paulsen | 347/19 |
| 6,271,928 B1 | 8/2001 | Bullock et al. | 358/1.16 |
| 6,302,527 B1 | 10/2001 | Walker | 347/50 |
| 6,305,795 B2 | 10/2001 | Childers et al. | 347/86 |
| 6,312,083 B1 | 11/2001 | Moore | 347/19 |
| 6,312,106 B1 | 11/2001 | Walker | 347/50 |
| 6,325,495 B1 | 12/2001 | Foth | 347/84 |
| 6,341,839 B1 | 1/2002 | Burikov et al. | 347/37 |
| 6,371,586 B1 | 4/2002 | Saruta | 347/7 |
| 6,405,055 B1 | 6/2002 | Silverbrook et al. | 455/556 |
| 6,464,317 B2 | 10/2002 | Miyazawa | 347/14 |
| 6,508,399 B2 * | 1/2003 | Sasaki et al. | 235/381 |

FOREIGN PATENT DOCUMENTS

| | | |
|---|---|---|
| JP | 11 265463 | 9/1999 |
| WO | WO 95/09084 | 4/1995 |
| WO | WO 98/51507 | 11/1998 |
| WO | WO 99/04368 | 1/1999 |
| WO | WO 99/21713 | 5/1999 |
| WO | 99/49379 | 9/1999 |

OTHER PUBLICATIONS

Notification of Transmittal of the International Search Report with a copy of the International Search Report, for International Application No. PCT/US 01/17146, filed May 25, 2001.

"Standard Read/Write Identification IC", by TEMIC Semiconductor GmbH, Heilbronn, Germany, (Apr. 1999).

"Introducing the New SmartGuard™ and SmartShield™ Advanced Security Options", pamphlet by Fargo Electronics, Inc., Eden Prairie, Minnesota (1998).

Partial International Search for International Application No. PCT/US 01/17146, filed May 25, 2001 (with Invitation to Pay Fees).

International Search Report for International Application No. PCT/US 00/01697, filing date Jan. 21, 2000, dated Oct. 18, 2000.

Two page web site advertisement from Seiko Precision, entitled "The lastest design for your CD–R", re: CD Printer 2000.

Two page web site advertisement from Seiko Precision, entitled "CD Printer 2000".

Two page web site advertisement from Seiko Precision, entitled "CD Printer 4000".

* cited by examiner

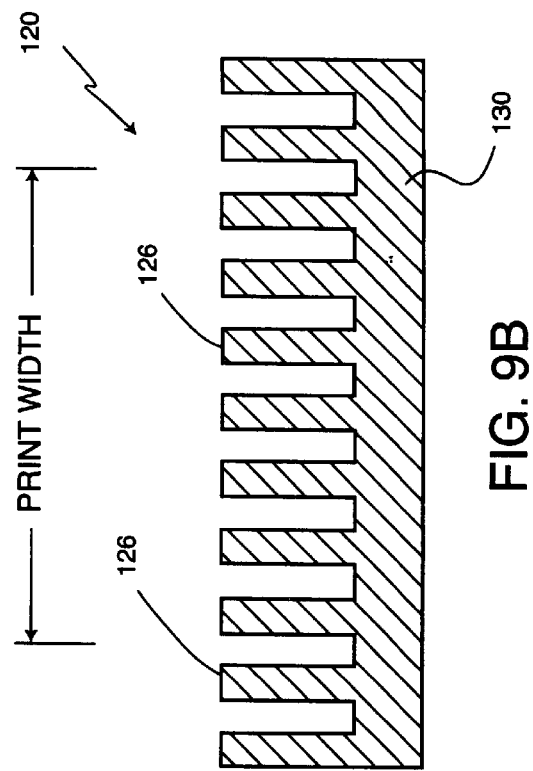
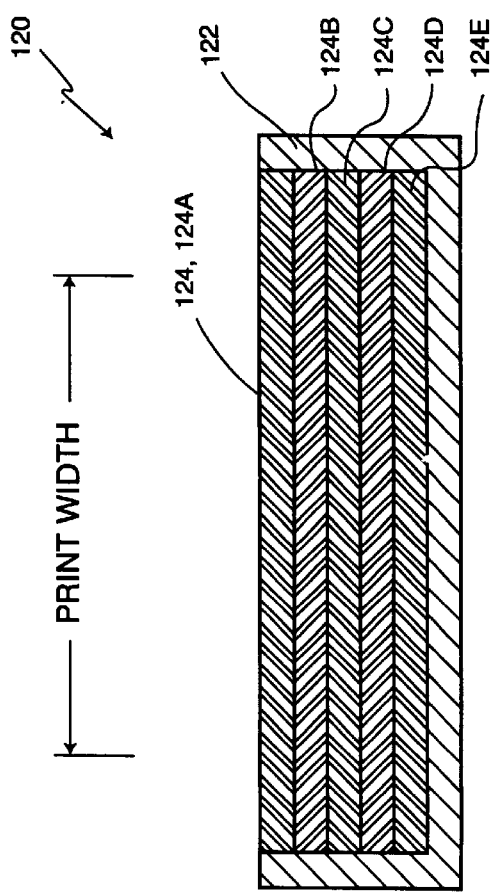

INK JET CARD PRINTER

CROSS REFERENCE TO RELATED APPLICATIONS

This application claims the benefit of U.S. Provisional Application Ser. No. 60/207,494, filed May 26, 2000, and entitled "INKJET CARD PRINTER;" the application is further a Continuation-In-Part of U.S. application Ser. No. 09/702,116, filed Oct. 30, 2000, and entitled "INK JET IDENTIFICATION CARD PRINTER SYSTEM," which is a Continuation-in-Part of U.S. application Ser. No. 09/178,455, now U.S. Pat. No. 6,264,296, filed Oct. 23, 1998, and entitled "INK JET IDENTIFICATION CARD PRINTER WITH LAMINATION STATION," which claims the benefit of U.S. Provisional Application Ser. No. 60/063,043, filed Oct. 24, 1997.

FIELD OF THE INVENTION

The present invention relates to card printers used to print images on a surface of rigid or semi-rigid planar substrates. More particularly, the present invention relates to an ink jet card printer having full edge-to-edge printing capability on a surface of the substrate.

BACKGROUND OF THE INVENTION

Card printers are used to print an image onto a surface of semi-rigid planar substrates. The substrates include, but are not limited to, plastic cards, tokens, and other types of rigid or semi-rigid planar substrates. Hereinafter, the terms "card" and "substrate" are intended to describe these and other rigid and semi-rigid substrates having various shapes and sizes.

In the past, graphical and textual information was placed on such cards using a labor intensive process in which, for example, an identification card was formed by manually stamping or imprinting an individual's data onto the card. Additionally, in some cases, an instant photograph was taken of the subject and adhered or laminated to the card.

Current methods for printing images on cards involve the use of a card printer and a computer. The image that is to be printed on the card is typically formatted by application software running on the computer. Data relating to the formatted image is then provided to the printer in the form of a print job. The printer processes the print job by printing the image onto a surface of the card. The image is generally formed by combining textual and graphical portions received from host applications running on the computer or from other input devices such as keyboards, scanners, and digital cameras. For many applications, it is desirable that the printer provide full edge-to-edge printing capability to allow an image be recorded over an entire surface of the card.

Most card printers are thermal based printers that include a ribbon having primary color dye panels and a thermal printhead. One type of thermal based printer is a dye sublimation printer, in which the thermal printhead heats the ribbon and causes dye on the color panels to be released and sublimate into a surface of the card. Unfortunately, these printers are only compatible with cards having a specialized surface into which the dye can sublimate. Furthermore, these printers are generally incapable of providing full edge-to-edge printing due to problems caused by the ribbon adhering to the edges of the card. Another type of thermal based printer prints the image onto a film, which is subsequently laminated to the card. This type of thermal based printer has full edge-to-edge printing capability, which is achieved by printing an image onto the film that is larger than the surface of the card on which it is to be laminated. Unfortunately, these printers are complex and often too expensive for small operations.

Another type of card printer is an ink jet based card printer. These printers are typically more affordable than thermal based printers and are somewhat less complicated. Ink jet card printers generally include an ink jet printhead and a transport mechanism. The ink jet printhead is designed to form the desired image on a surface of a card by spraying colored ink onto portions of the surface that are presented to the ink jet printhead in a print position by the transport mechanism. Typical transport mechanisms include a platen positioned immediately below the printhead and rollers positioned adjacent the printhead that pinch the card against the platen as it is transported through the print position. Typical ink jet printers are generally incompatible with semi-rigid substrates. Instead, thin and highly flexible substrates must be used that can bend around the platen and other rollers of the transport mechanism as they are transported. Additionally, the rollers typically contact side portions of the surface of the card when in the print position thereby obstructing the surface of the card and preventing the ink jet printhead from printing on the surface in those locations. As a result, these types of ink jet card printers are incapable of full edge-to-edge printing on the card. Even if the rollers of the transport mechanism were positioned such that the ink jet printhead would have the freedom to print, for example, from a side edge of the card to an opposing side edge, this type of printer is still prevented from printing edge-to-edge due to the contamination of the platen and other components of the transport mechanism that would result from spraying ink beyond the edges of the card as would be required for full edge-to-edge printing on the card. In addition to potentially clogging the transport mechanism and causing the printer to fail, the resulting contaminated components of the transport mechanism would transfer the contaminating ink to the cards that are being processed. As a result, most ink jet card printers are not suitable for full edge-to-edge printing and, instead, limit printing on the substrate to a smaller area defined by margins formed along the edges of the substrate.

However, some ink jet card printers include modified transport mechanisms that avoid some of the problems described above. These printers allow printing on surfaces of semi-rigid cards by adapting the transport mechanism to transport the cards through the printer in a tray. The trays generally include a depressed region that conforms to the shape of the card and exposes a top planar surface of the card on which an image is to be printed. Unfortunately, these printers are still unable to provide full edge-to-edge printing capability without contaminating the tray and other components of the transport mechanism. Additionally, these printers are significantly limited in the number of cards that can be processed without user intervention.

Therefore, a need exists for an improved ink jet card printer that is compatible with semi-rigid cards while providing full edge-to-edge printing capability.

SUMMARY OF THE INVENTION

The present invention is directed to an ink jet card printer that includes an ink jet printhead and a transport mechanism. The ink jet printhead is adapted to print on portions of a surface of the card that are presented in a print position along a print path. The transport mechanism includes at least one cantilevering mechanism that is positioned to a side of the print position along the print path. The cantilevering mechanism is adapted to unobstructively present the surface of the card to the printhead in the print position.

BRIEF DESCRIPTION OF THE DRAWINGS

FIGS. 9A and 9B are side cross-sectional views of ink over-spray collectors in accordance with various embodiments of the invention.

DETAILED DESCRIPTION OF THE PREFERRED EMBODIMENTS

Figure 1:
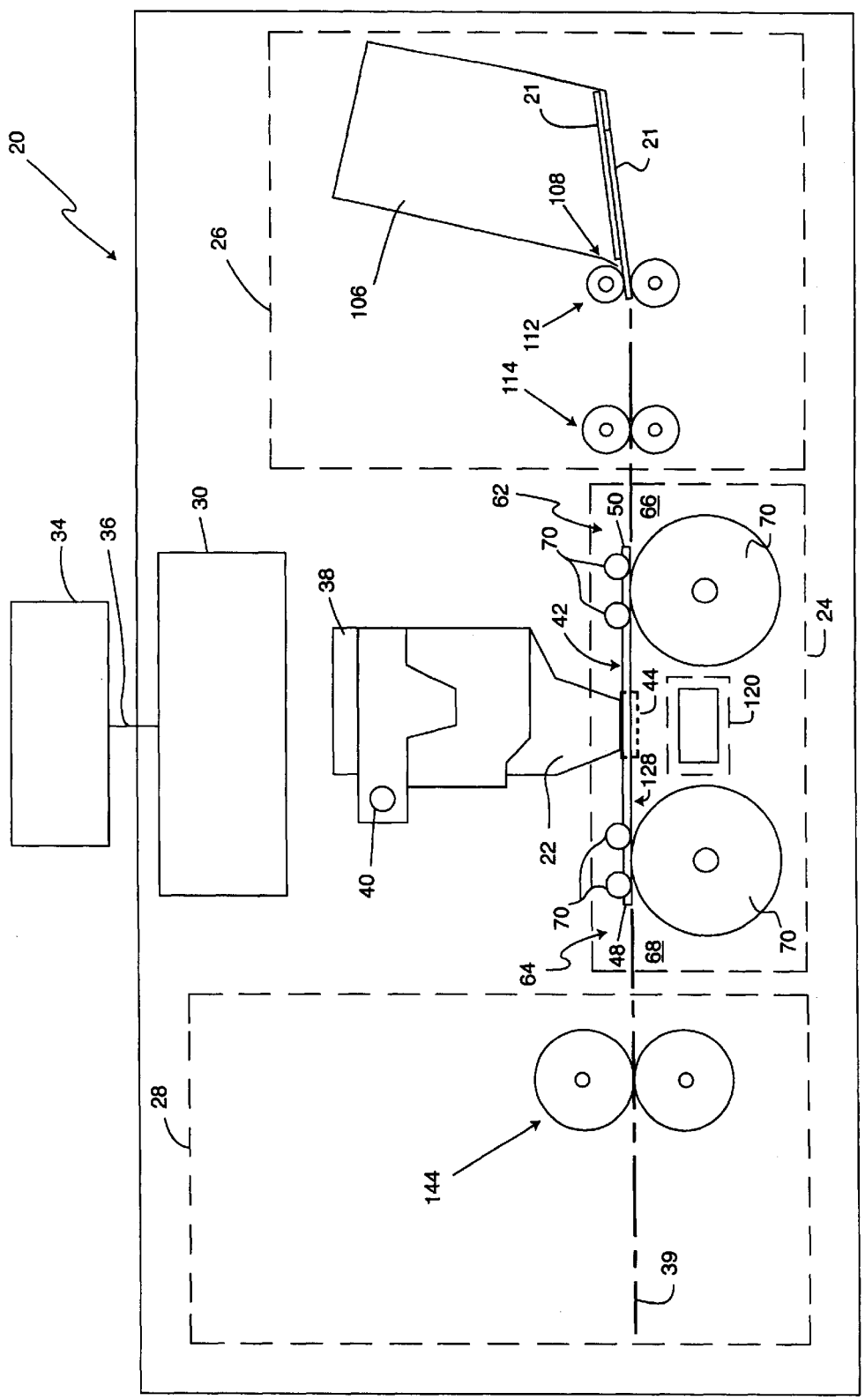
FIG. 1 is a simplified side view of an ink jet card printer in accordance with various embodiments of the invention.

FIG. 1 is a simplified block diagram of an ink jet card printer 20, in accordance with various embodiments of the invention. Printer 20 generally includes an ink jet printhead 22, a transport mechanism 24, an input portion 26, an output portion 28, and a controller 30. A personal computer (PC) 34 can communicate with controller 30 through input/output (I/O) or data bus 36. Data bus 36 can be any suitable connection, such as a parallel cable, serial cable, or a Universal Serial Bus (USB) cable, through which data is provided to controller 30 contained within printer 20. A user operates PC 34 to configure and format a print job using a software application. Data relating to the print job is then provided to controller 30 over data bus 36, and controller 30 uses the data to process the print job by controlling the various components of ink jet identification card printer 20.

Figure 2:
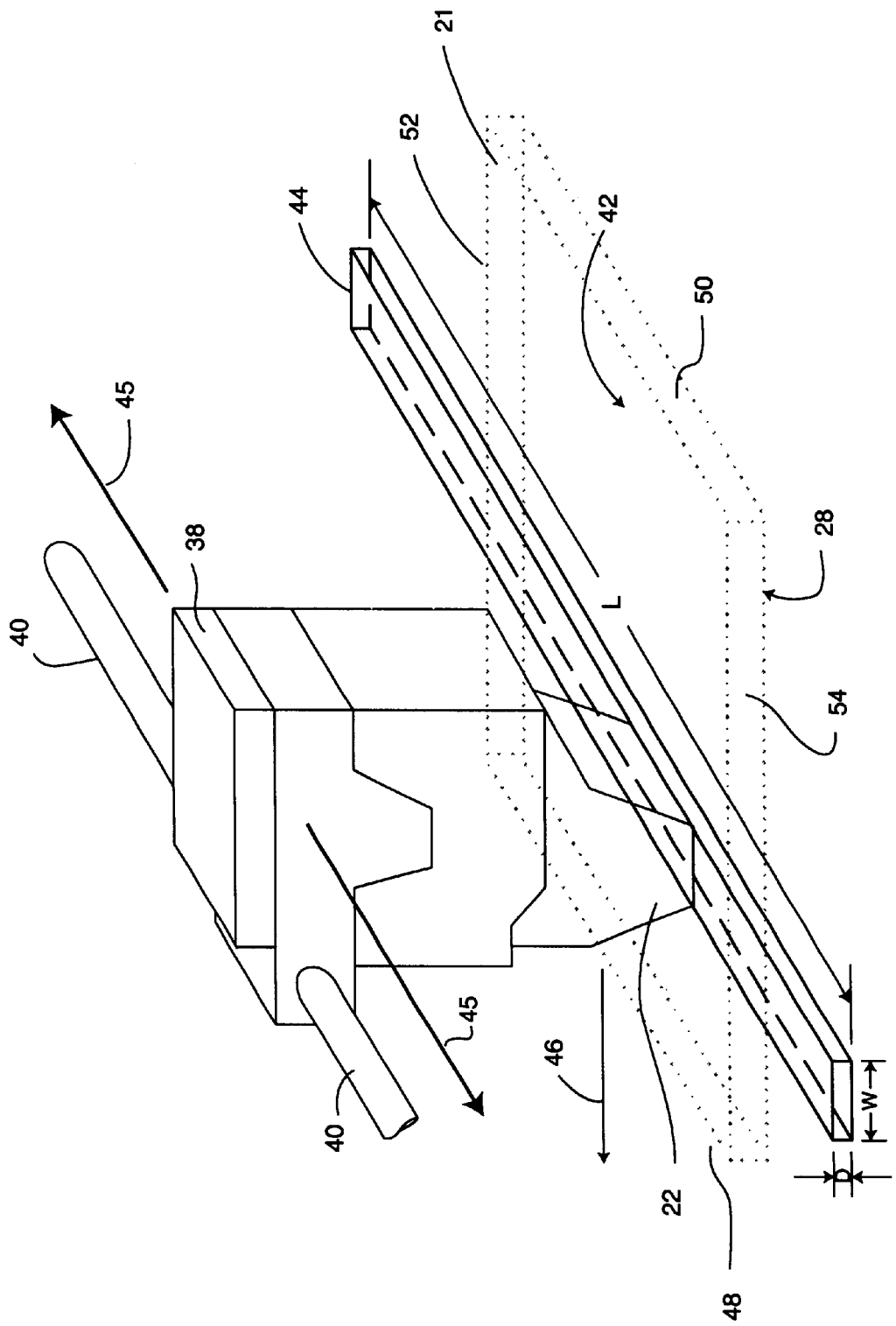
FIG. 2 is a simplified perspective view illustrating a print position of an ink jet printhead.

Ink jet printhead 22 includes an ink cartridge 38 containing a supply of ink. Printhead 22 is generally adapted to move along an axis that is directed into the paper on which FIG. 1 is provided by sliding along rod 40. The movement of printhead 22 is controlled by controller 30 and is actuated using conventional methods. Printhead 22 is generally adapted to print on portions of surface 42 of card 21 that are presented to printhead 22 in a print position 44 along a print path 39, as illustrated in FIG. 2.

Print position 44 is generally defined by a volume of space in which surface 42 of card 21 must be presented to ink jet printhead 22 to ensure accurate printing of the image onto surface 42. Print path 39 (FIG. 1) runs through the center of print position 44 and indicates a preferred position of surface 42 of card 21. Print path 39 is typically a distance of 0.025–0.050 inches from printhead 22. The volume of print position 44 includes a length L, a width W, and a depth D. The length L is generally limited to the range of motion of printhead 22, indicated by arrows 45, along rod 40. The width W is defined as the distance over which printhead 22 is capable of printing ink in a single pass across the substrate. Typical ink jet printheads 22 have print widths W of approximately 0.4 inches. The depth D of print position 44 defines a distance from print path region within which ink can be properly transferred from printhead 22 to surface 42. The depth D is typically approximately 0.01 inches. Therefore, surface 42 of card 21 is preferably positioned plus or minus 0.005 inches from print path 39. The accuracy of the printing is further affected by changes in the distance separating surface 42 from printhead 22, which can lead to color variance within the printed image, and imprecise control of the movement of card 21 through the print position, which can lead to banding. Consequently, printhead 22 can accurately apply ink to only those portions of surface 42 of card 21 that are presented to printhead 22 in the print position 44 and at a substantially constant distance from printhead 22 as card 21 is precisely moved by transport mechanism 24 along print path 39.

One aspect of the present invention is directed to a transport mechanism 24, which allows printer 20 to have full edge-to-edge printing capability while avoiding problems of contaminating transport mechanism 24 with over-sprayed ink. To that end, transport mechanism 24 is adapted to receive at least one card 21 from input portion 26 and present the entire surface 42 of card 21 to printhead 22 in the print position 44 along print path 39. Surface 42 is generally defined by leading edge 48, trailing edge 50, and side edges 52 and 54, as shown in FIG. 2. As a result, printer 20 is able to print an image over the entire surface 42 of card 21 by spraying ink beyond the surface 42 of card 21.

Transport mechanism 24 includes first and second cantilevering mechanisms 62 and 64, respectively, as shown in FIG. 1. First and second cantilevering mechanisms 62 and 64 are positioned on input and output sides 66 and 68 of print position 44, respectively, to avoid contamination by ink sprayed by printhead 22 beyond the edges of card 21. However, additional protection from contamination by the over-sprayed ink is provided by an ink over-spray collector 120 (FIG. 1), which will be discussed in greater detail below.

Figure 3A:
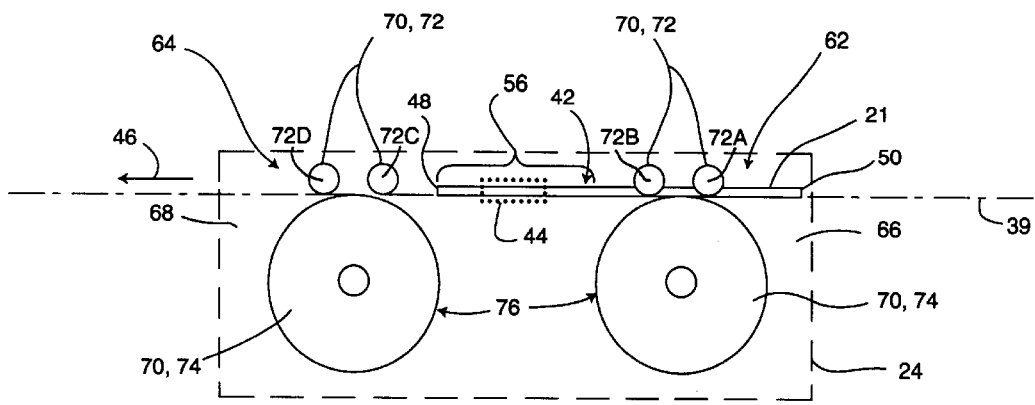
FIGS. 3A–C are simplified side views illustrating first, second, and third positions, respectively, in which a card is supported by a transport mechanism while moving through a print position in accordance with various embodiments of the invention.
Figure 3B:
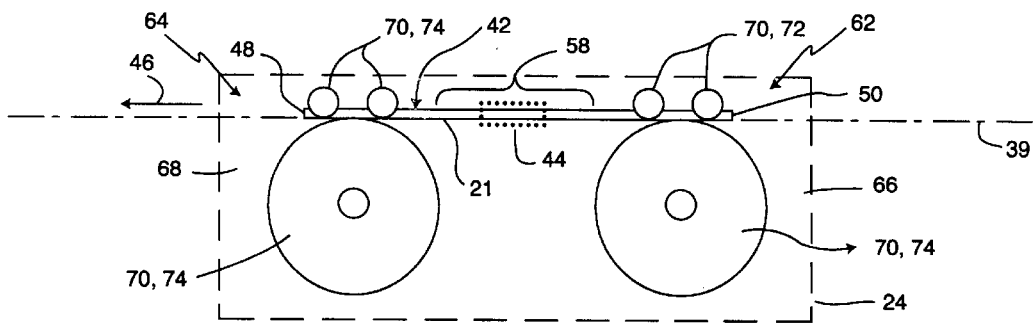
Figure 3C:
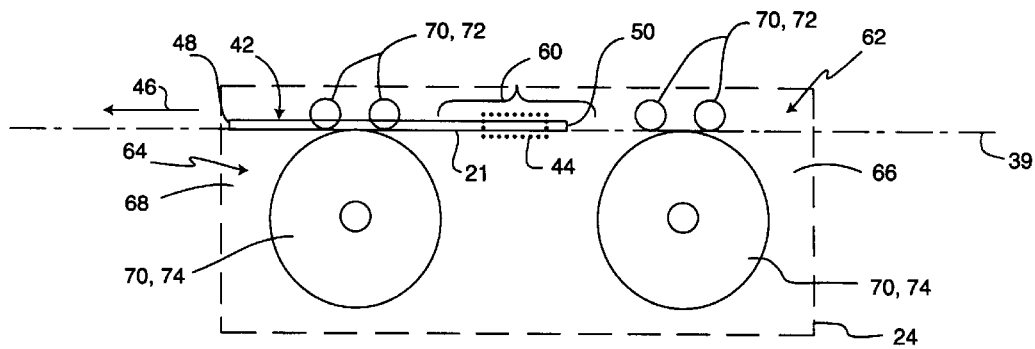

FIGS. 3A–C show three illustrative positions card 21 is supported in, by first and second cantilevering mechanisms 62 and 64, as surface 42 of card 21 is moved through print position 44. FIG. 3A shows first cantilevering mechanism 62 supporting card 21 in a first illustrative position in which a leading portion 56 of surface 42 is presented to printhead 22 in the print position as card 21 is moved along print path 39 in the direction indicated by arrow 46. Leading portion 56 is generally defined as a portion of top surface 42 of card 21 between side edges 52 and 54 and including an area of surface 42 that includes leading edge 48 and extends toward trailing edge 50. Printhead 22 is thereby provided unobstructed access to leading portion 56 of card 42 as leading portion 56 is cantilevered through print position 44. As a result, printhead 22 can transfer ink to the entire leading portion 56 of surface 42 including leading edge 48 and side edges 52 and 54.

FIG. 3B shows card 21 in the second illustrative position in which a middle portion 58 of surface 42 is presented to printhead 22 in print position 44 as transport mechanism 24 moves card 21 along print path 39 in the direction indicated by arrow 46. Middle portion 58 is generally defined as the area of surface 42 located between side edges 52 and 54 and extending from the leading portion 56 toward trailing edge 50. In this position, card 21 is supported by both first and second cantilevering mechanisms 62 and 64 and printhead 22 has unobstructed access to middle portion 58 as it is moved through print position 44. As a result, printhead 22 can transfer ink to the entire middle portion 58 of surface 42 including side edges 52 and 54 as card 21 is supported in the second position.

FIG. 3C shows card 21 in a third illustrative position in which card 21 is supported by second cantilevering mechanism 64 and a trailing portion 60 of surface 42 is presented to printhead 22 in the print position 44 as card 21 is moved along print path 39 in the direction indicated by arrow 46. Trailing portion 60 is generally defined as the area of surface 42 between side edges 52 and 54 and extending from trailing edge 50 to middle portion 58. Here, printhead 22 has unobstructed access to trailing portion 60 as it is moved through print position 44. As a result, printhead 22 can transfer ink to the entire trailing portion 60 of surface 42 including side edges 52 and 54 and trailing edge 50 of card 21.

Consequently, the three positions in which transport mechanism 24 is capable of supporting card 21 as it moves along print path 39, provides printhead 22 with unobstructed access to the entire surface 42 of card 21. As a result, printhead 22 is allowed to record ink over the entire surface 42 of card 21.

Each of the cantilevering mechanisms 62 and 64 include guide members 70, which are used to perform the desired cantilever support function. The main function of the guide members 70 is to maintain card 21 in a substantially level plane that is parallel to surface 42 of card 21 and print path 39 as card 21 travels through print position 44. Guide member 70 can take on many different forms and still provide the desired cantilever support function aspect of the present invention. Several examples of suitable guide members 70 and the cantilevering mechanisms that they form will be discussed in greater detail below.

In one embodiment, cantilevering mechanisms 62 and 64 include guide members 70 in the form of a pair of upper guide rollers 72 and a lower guide roller 74 as shown in FIGS. 3A–C. Upper guide rollers 72 are spaced apart along print path 39 and lower guide roller 74 is positioned to pinch card 21 against the upper guide rollers 72 and transport card 21 along print path 39 in the direction indicated by arrow 46. Each cantilevering mechanism 62 and 64 is capable of cantilevering card 21 through print position 44 by stabilizing card 21 in a plane running parallel to surface 42 of card 21 and print path 39.

A card 21 that is received by first cantilevering mechanism 62 from input portion 26 is pinched between upper guide rollers 72A and 72B and lower guide roller 74 and driven into the first position, as illustrated in FIG. 3A. When leading edge 48 engages output side upper guide roller 72C and lower guide roller 74 of second cantilevering mechanism 64, card 21 is pinched therebetween and drawn forward along print path 39 under output side upper guide roller 72D, thereby placing card 21 in the second position where it is held by both first and second cantilevering mechanism 62 and 64, as illustrated in FIG. 3B. Once trailing edge 50 of card 21 is released from first cantilevering mechanism 62, card 21 is in the third position and trailing portion 60 is supported in print position 44 by second cantilevering mechanism 64, as illustrated in FIG. 3C.

Lower guide roller 74 of the first and second cantilevering mechanism 62 and 64 is preferably motorized to drive card 21 along print path 39 using a motor (not shown), in accordance with conventional methods. Surface 76 of lower guide member 74 is preferably formed of a compressible material, such as rubber, to assist in the gripping and pinching of card 21 against upper guide rollers 72. Proper grip of card 21 is necessary to provide precise control of the movement of card 21 through print position 44. The force applied against card 21 as it is pinched can be selected by choosing an appropriate rubber coating and adjusting the distance separating lower guide roller 74 and upper guide roller 72. Alternatively, the position of roller 74 can be biased toward upper guide roller 72 with springs in accordance with conventional methods.

Figure 4:
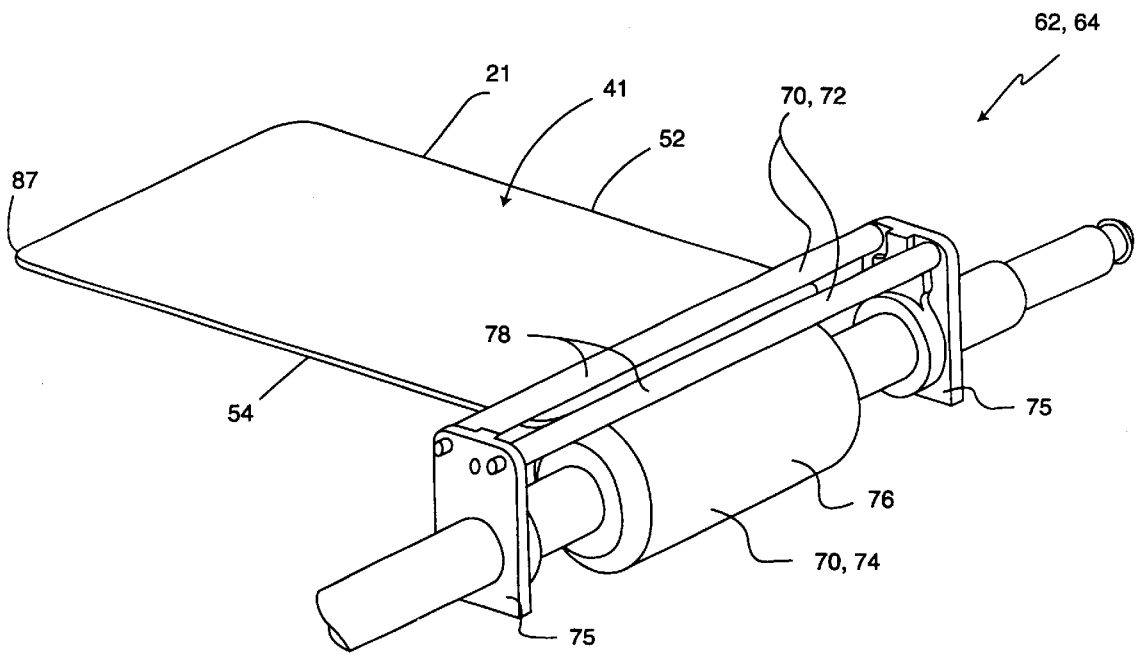
FIG. 4 is a simplified perspective view of a portion of a transport mechanism in accordance with an embodiment of the invention.

As mentioned above, the distance D of print position 44 (FIG. 2) allows for only a small deviation in position from print path 39 as card 21 is transported through print position 44. As a result, it is important that the cantilevering mechanisms of transport mechanism 24 have very tight tolerances. In one embodiment, bushings 75 are used to support upper guide rollers 72 and lower guide roller 74 as shown in FIG. 4. Each bushings 75 can be mounted to a suitable side wall (not shown) of transport mechanism 24. Bushing 75 provides for tight tolerances of the spatial relationship between upper guide rollers 72 and lower guide roller 74 due to its unitary construction. Bushings 75 can adjust the angle at which card 21 is directed along print path 39 by adjusting the angle at which bushings 75 are mounted to the side walls of transport mechanism 24. Those skilled in the art will recognize that many other different methods can be used to mount guide members 70 of transport mechanism 24 to ensure that surface 42 of card 21 is properly positioned within print position 44 as card 21 is moved along print path 39.

Figure 5:
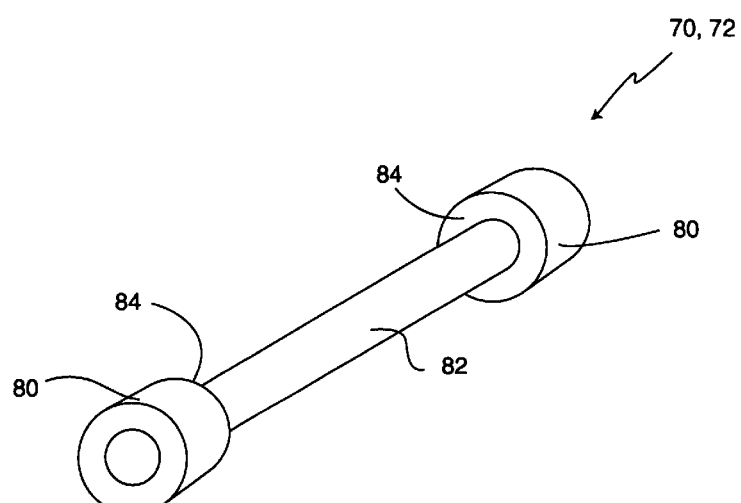
FIG. 5 is a simplified perspective view of a guide roller in accordance with an embodiment of the invention.

Upper guide rollers 72 are preferably formed of steel and are cylindrical in shape as shown in FIG. 4. Surface 78, which contacts top surface 42 of card 21, can be coated with a non-stick coating such as Teflon™ to prevent contamination of surface 42. FIG. 5 is a simplified perspective view of another embodiment of upper guide roller 72, which includes side wheels 80 connected by axle 82. Each side wheel 80 includes an inner guide surface 84. The distance separating inner guide surfaces 84 is substantially the same as a width of card 21 measured between side edges 52 and 54 (FIG. 2). This embodiment of upper guide roller 72 limits the ability of card 21 to stray sideways as it travels along print path 39 resulting in more precise positioning of surface 42 of card 21 in the print position 44.

Alternative configurations of the first and second cantilevering mechanisms 62 and 64, utilizing guide rollers 72 and 74, include reversing the positions of the upper and lower guide rollers 72 and 74 as well as using multiple guide rollers 72, such as a second pair of guide rollers 72 to replace lower guide roller 74. It may be of particular benefit to reverse the position of upper guide roller 72 and lower guide roller 74 of second cantilevering mechanism 64 in order to provide early support of card 21 by upper guide roller 72C (FIG. 3A) as it is moved into the second position.

Figure 6B:
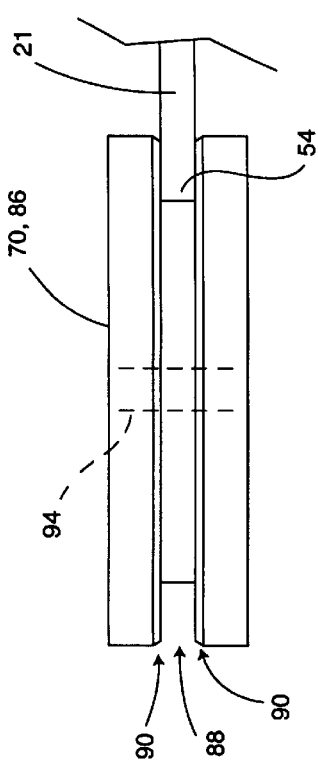
FIGS. 6A and 6B are top and front views, respectively, of a cantilevering mechanism in accordance with an embodiment of the invention.
Figure 6A:
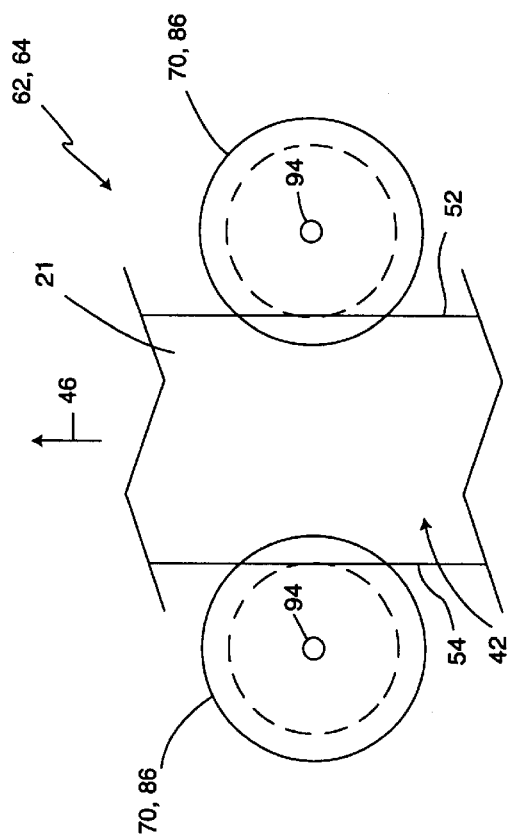

FIGS. 6A and 6B show top and front views, respectively, of another embodiment of guide members 70 that are used to form first or second cantilevering mechanisms 62 and 64. Here, guide members 70 are grooved guide wheels 86, each of which includes a groove 88 that substantially conforms to the edges 52 and 54 of card 21, as shown in FIG. 5B. Outer edges 90 can be beveled away from card 21 to more easily receive a card 21. In addition, grooved guide wheels 86 can be formed of a compressible material to enhance their ability to grip a card 21 and provide precise control of the movement of card 21 through print position 44. Grooved guide wheels 86 are further aided in their ability to grip a card 21 by the typically rounded corners 87 (FIG. 4) of standard-sized cards 21. Grooved guide wheels 86 are positioned to pinch card 21 and are adapted to provide the desired cantilevering function by supporting card 21 at edges 52 and 54 within groove 88. At least one of the grooved guide wheels 86 is motorized to drive card 21 in the desired direction by rotating about axis 94.

In the depicted embodiment, grooved guide wheels 86 have a sufficient diameter and groove 88 has a shape to allow a single pair of the guide wheels 86 to support card 21 in the first position (FIG. 3A) when used as a first cantilevering mechanism 62, and in the third position (FIG. 3B), when used as a second cantilevering mechanism 64. Alternatively, multiple grooved guide wheels 86 can be used to ensure proper support of card 21.

Figure 7B:
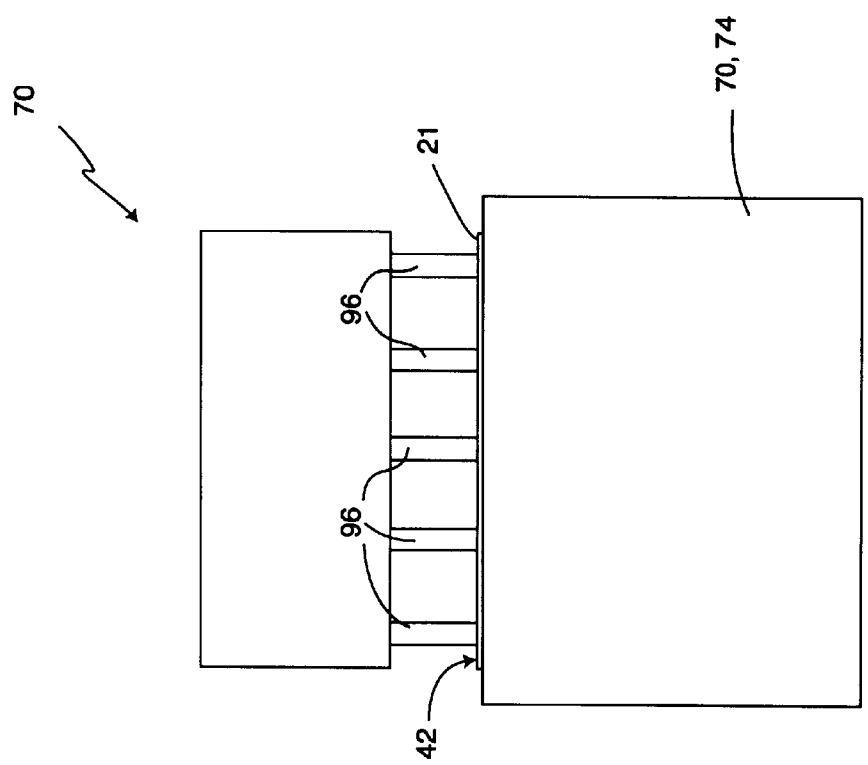
FIGS. 7A and 7B are simplified side and front views, respectively, of a cantilevering mechanism in accordance with an embodiment of the present invention.
Figure 7A:
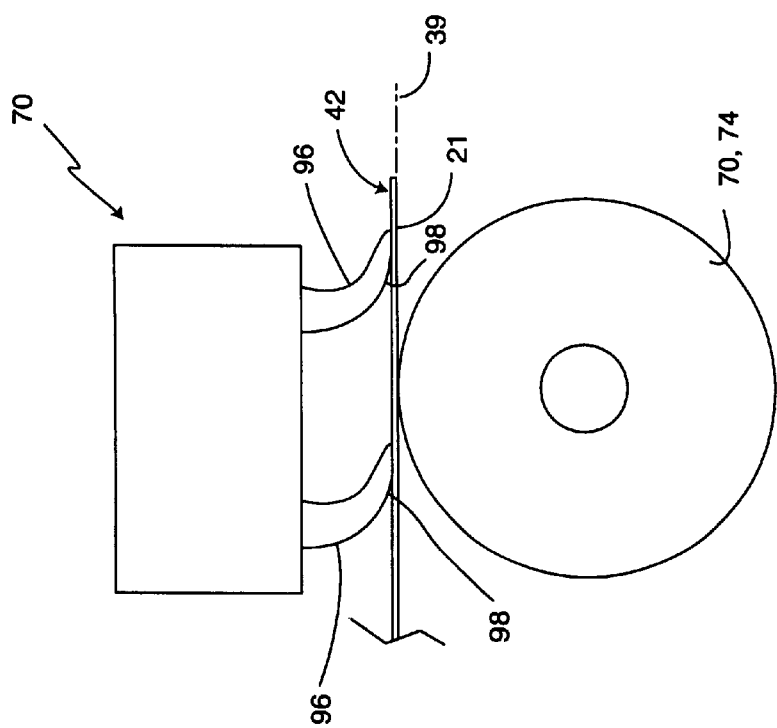

FIGS. 7A and 7B show side and front views, respectively, of a cantilevering mechanism 62 or 64 utilizing yet another example of a guide member 70 that is capable of providing the desired cantilevering function to position a card 21 in the first, second and third positions described above. Here, an upper guide member 70 includes a plurality of flexible finger-like projections 96 that pinch card 21 between a non-stick bottom surface 98 of projections 96 and lower guide roller 74. This embodiment of guide member 70 generally includes front and back projections 96, that perform similarly to upper guide rollers 72, shown in FIGS. 3A–3C. Fingers 96 can be continuous in width (i.e., into the paper of FIG. 7A) and extend substantially across card 21 between side edges 52 and 54, or be formed of a plurality of front and back projections 96, which are spaced apart between side edges 52 and 54 of card 21, as shown in FIG. 7B.

Figure 8:
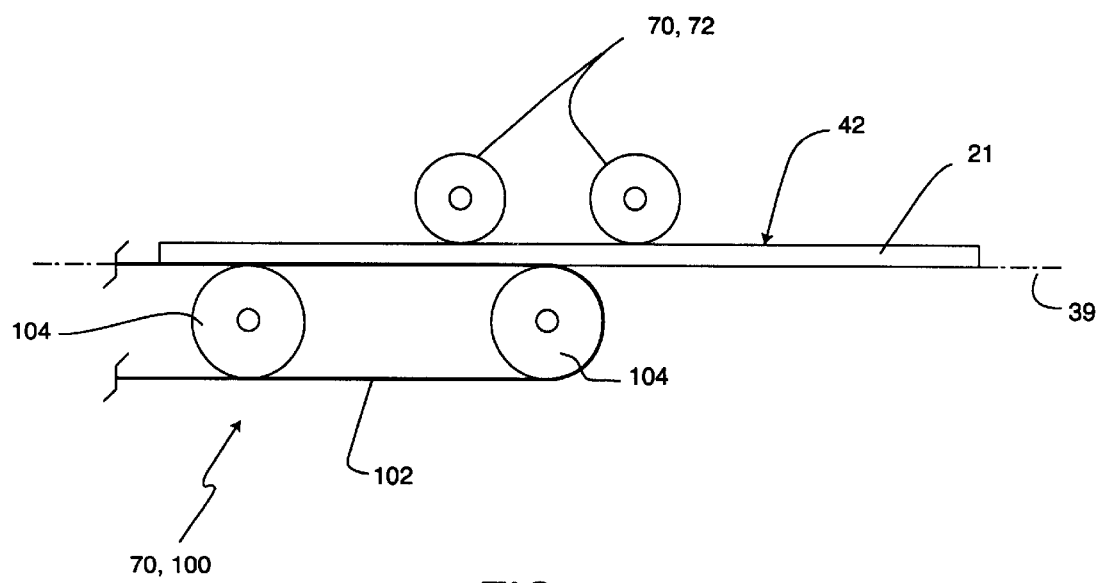
FIG. 8 is a simplified side view of a cantilevering mechanism in accordance with an embodiment of the invention.

FIG. 8 shows yet another embodiment of guide member 70 for use with cantilevering mechanisms 62 and 64 of the present invention. Here, conveyor belt 100 is used as a lower guide member 70, which performs a similar function as lower guide roller 74 (FIGS. 3A–3C). Conveyor belt 100 includes belt 102 on which card 21 is supported. Belt 102 is driven by rollers 104, at least one of which is motorized to drive belt 102 in the desired direction using conventional methods. An upper guide member 70, shown here as upper guide rollers 72, acts to pinch card 21 against belt 102 and a roller 104 to provide the support necessary to cantilever card 21 in the first or third positions discussed above.

Referring again to FIG. 1, input portion 26 is positioned adjacent transport mechanism 24 and is adapted to supply at least one card at a time to transport mechanism 24. Input portion 26 includes a supply of cards 21, which can be stored in a container 106. Container 106 can be in the form of a card cartridge, that can be plugged into an appropriate slot of input portion 26 to facilitate easy loading of the supply of cards. In one embodiment, container 106 includes a bottom slot 108 that is sized to allow a single card 21 to pass through and thereby prevent undesirable misfeeds. Container 106 can also be tilted to splay cards 21 contained therein and cause leading edge 48 of the bottom card 21 to extend through slot 108, as shown in FIG. 1.

A feeding mechanism 110 is adapted to retrieve a card 21 from container 106 at slot 108 and transfer the card 21 to transport mechanism 24 where it is received by first cantilevering mechanism 62. Alternatively, it is possible to configure input portion 26 such that card 21 is fed directly to transport mechanism 24 from slot 108, thereby eliminating the need for feeding mechanism 110. Feeding mechanism 110 can include pinch roller pairs 112 and 114, which are driven by a motor (not shown) using conventional methods. Pinch rollers 112 are adapted to retrieve a card 21 from the supply of cards stored in container 106 through slot 108. The retrieved card 21 is then handed off to pinch rollers 114, which provide the retrieved card 21 to transport mechanism 24.

Once a card 21 is transferred to transport mechanism 24, the card 21 is transported through the first, second and third positions discussed above, during which printhead 22 records an image onto surface 42 in accordance with the print job. To ensure full edge-to-edge printing of the image onto surface 42 of card 21, the image of the print job is generally formed larger than the area of surface 42 of card 21. As a result, printhead 22 will spray ink beyond leading edge 48, trailing edge 50, and side edges 52 and 54. As mentioned above, first and second cantilevering mechanisms 62 and 64 are preferably spaced from print position 44 a suitable distance (e.g., 0.3–0.6 inches) to avoid contamination by the over-sprayed ink. However, to better ensure that the over-sprayed ink does not contaminate the components of transport mechanism 24 and other components of printer 20, printer 20 includes an ink over-spray collector 120 positioned as close as possible to print position 44 without hindering the transport of card 21 and opposite printhead 22 as shown in FIG. 1.

FIGS. 9A and 9B show cross-sectional views of various embodiments of ink over-spray collector 120 in accordance with the present invention. Ink over-spray collector 120 generally includes a trough 122, which is preferably wider than the width W of print position 44 and longer than the distance separating side edges 52 and 54 of card 21 (FIG. 2). Trough 122 can contain an ink-absorbing material 124 to soak up the ink that comes into contact with it. In the embodiment shown in FIG. 9A, several layers 124A–124E of the ink-absorbing material 124 can be positioned in trough 122. Here, a top layer 124A of ink-absorbing material can be removed and discarded when it becomes saturated with ink to reveal the next layer 124B of ink-absorbing material.

The embodiment of ink over-spray collector 120 depicted in FIG. 9B includes projections 126, which act to diffuse and trap over-sprayed ink to reduce the potential for contamination of bottom side 128 (FIG. 1) of card 21 and further reduce the spread of over-sprayed ink to other components of printer 20. The size, orientation, and number of projections 126 can be adjusted for best performance. Furthermore, the material used to form projections 126 and base 130, from which they extend, can include ink-absorbing materials for added absorption of over-sprayed ink.

Ink over-spray collector 120 can also be configured to have an electrical charge that is opposite the charge of ink that does not adhere to surface 42 of card 21, to attract circulating particles and improve the ability of ink over-spray collector 120 to collect over-sprayed ink.

Figure 10:
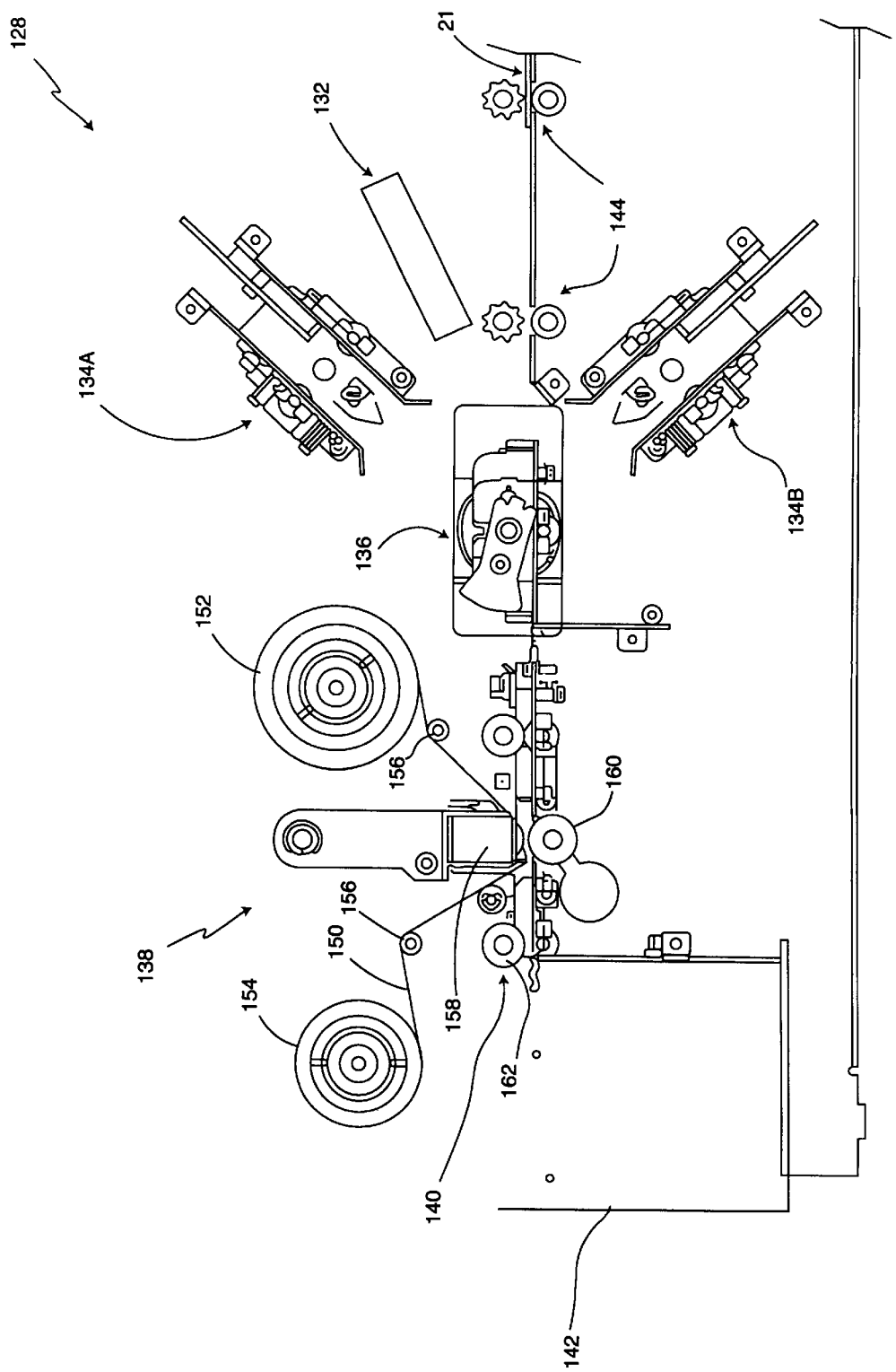
FIG. 10 is a simplified side view of optional components of an output portion of card printer in accordance with various embodiments of the invention.

Output portion 28 (FIG. 1) receives a printed card 21 from transport mechanism 24 and can include various components that are adapted to perform post-printing processing of printhead card 21. FIG. 10 is a simplified side view of output portion 28, which illustrates several optional components that could form output portion 28. These components include a drying device 132, an encoder 134, a card flipper 136, a laminator 138, an embosser 140, and an output hopper 142 for collecting and stacking printed cards 21. Output portion 28 can include one or more of these components as needed.

Drying device 132 is adapted to dry ink that is printed onto card 21. Drying device 152 can be positioned as desired along print path 39 within output portion 28. Drying device 132 can be a fan, a heater, an ultraviolet light source, or other type of drying device. Drying device 132 can also be a heated roller, such as that described in co-pending U.S. application Ser. No. 09/702,116, entitled "INK JET IDENTIFICATION CARD PRINTER SYSTEM," which is assigned to the assignee of the present application and is incorporated herein by reference.

Encoders 134A and 134B are adapted to encode data onto card 21 using conventional methods. Encoder 134A can be a magnetic card encoder that is adapted to encode data onto a magnetic stripe (not shown) of card 21. Encoder 134B can be configured to encode circuitry carried on card 21, such as that known in the industry as "smart card circuitry," "card memory," "card processor," or "stored value circuitry." In general, the electronic circuitry may be used to store additional information on identification card 21, beyond what is stored on the magnetic stripe. The encoding of data onto card 21 using encoders 134A and 134B can be accomplished using conventional methods.

Card flipper 136 allows printer 20 to, for example, selectively move card 21 up into encoder 134A or down into encoder 134B. Card flipper 136 can also flip card 21 such that bottom surface 128 (FIG. 1) is facing upward to allow an image to be recorded on it by printhead 22. To accomplish the printing on bottom surface 128 of card 21, card 21 is fed back to transport mechanism 24 using an appropriate feeding mechanism such as rollers 144, which are also adapted to retrieve card 21 from transport mechanism 24 and transport card 21 through output portion 128. Card flipper 136, preferably avoids contacting the printed surface 42 of card 21 using, for example, pairs of grooved guide wheels 86, shown in FIGS. 6A and 6B.

Laminating station 138 is configured to apply a protective layer to card 21 to protect the printing on surface 42 from water, light, chemicals, abrasion and/or other elements or actions which may damage the printing on card 21. In one embodiment, laminating station 138 can apply a protective layer in the form of a spray-on sealant. In the depicted embodiment, the protective layer is in the form of a laminate material 150, which is moved between a supply roll 152 to a take-up roll 154, past rollers 156 and heater 158. Laminate material 150 preferably comprises a thermal transfer overlaminate film that is pressed against surface 42 of card 21 due to the application of pressure from platen 160. Alternatively, laminate material 150 can comprise a plurality of individual laminates carried on a web. The individual laminates can be sized to fit edge-to-edge of card 21 to thereby eliminate a need to trim the laminate material once laminated to card 21.

Embosser 140 can be used to emboss a security mark onto surface 42 of card 21. Embosser 140 includes an embossing roller 162 that applies the desired mark to surface 42 of card 21 using conventional methods.

Although the present invention has been described with reference to preferred embodiments, workers skilled in the art will recognize that changes may be made in form and detail without departing from the spirit and scope of the invention. For example, the various components of the present invention, such as transport mechanism 24 and input portion 26, can be modified such that multiple cards 21 can be processed simultaneously. Here, multiple cards 21 can be fed simultaneously to transport mechanism 24 by input portion 26 in a row wherein the leading edges 48 of the cards and the trailing edges 50 of the cards are aligned. The primary limitation to the number of cards that can be fed in the row is the length L (FIG. 2) of print position 44. Additionally, guide members 70 can take on many different forms and still provide the desired function of supporting card 21 in the first, second, and third positions. In addition to those examples described above, guide members 70 can include a vacuum chuck that does not require the use of both upper and lower guide members to transport a card 21 through the print position in the manner described above. Also, the described embodiments of ink over-spray collector 120 are merely examples of configurations that can perform the desired ink over-spray collection and many other suitable forms of ink over-spray collection are possible. The dependent claims are therefore intended to cover all such changes and modifications, which fall within the true spirit and scope of the invention.

What is claimed is:

1. An ink jet identification card printer for edge-to-edge printing on a surface of a card, the printer comprising:

an ink jet printhead adapted to print on portions of the surface of the card that are presented in a print position along a print path; and a transport mechanism including a first cantilevering mechanism positioned on an input side of the print position and including upper and lower guide members that provide at least three points of support of the card at locations that are displaced from each other along the print path, wherein the upper and lower guide members are cantilevered through the print position for printing on the surface thereof with the printhead.

2. The printer of claim 1, wherein the transport mechanism includes:

a second cantilevering mechanism positioned on an output side of the print position and adapted to support the card in a third position in which a trailing portion of the card is cantilevered through the print position for printing on the surface thereof with the printhead.

3. The printer of claim 2, wherein the first and second cantilevering mechanisms cooperate to support the card in a second position in which a middle portion of the surface is moved through the print position.

4. The printer of claim 2, wherein the second cantilevering mechanism includes at least one guide member.

5. The printer of claim 2, wherein at least one of the first and second cantilevering mechanisms includes two upper guide rollers and one lower guide roller.

6. The printer of claim 2, wherein at least one of the first and second cantilevering mechanisms includes two lower guide rollers and one upper guide roller.

7. The printer of claim 2, wherein at least one of the first and second cantilevering mechanisms includes a conveyor belt and an upper guide member, wherein the card travels between the upper guide member and the conveyor belt.

8. The printer of claim 2, wherein at least one of the first and second cantilevering mechanisms includes a pair of grooved guide wheels.

9. The printer of claim 2, wherein the card includes side edges, the leading portion of the card includes a leading edge, the trailing portion of the card includes a trailing edge, and the printhead is adapted to print on the surface of the card at least to the side, leading and trailing edges.

10. The printer of claim 1, wherein the guide members are selected from a group consisting of a guide roller, a pair of side wheels, a grooved guide roller, a heated roller, and a conveyor belt.

11. The printer of claim 1, including an ink over-spray collector positioned adjacent the print position and opposite the printhead and adapted to collect ink that is sprayed beyond the surface of the card.

12. The printer of claim 11, wherein the ink over-spray collector includes a trough.

13. The printer of claim 11, wherein the ink over-spray collector includes an ink-absorbing material.

14. The printer of claim 11, wherein the ink over-spray collector includes a plurality of separable layers of ink-absorbing material.

15. The printer of claim 11, wherein the ink over-spray collector includes an electrical charge that is opposite a charge of the ink that does not adhere to the card, whereby ink particulates are attracted to the ink over-spray collector.

16. The printer of claim 11, wherein the ink over-spray collector includes a plurality of projections.

17. The printer of claim 1, including an input portion having a supply of cards.

18. The printer of claim 17, wherein the input portion includes a card cartridge containing the supply of cards.

19. The printer of claim 17, wherein the input portion includes a card feeder mechanism adapted to feed at least one card from the supply of cards.

20. The printer of claim 1, including a controller adapted to control the transport mechanism and the ink jet printhead to facilitate printing an image on the surface of the card.

21. The printer of claim 1, including a card output portion adapted to receive the card from the transport mechanism.

22. The printer of claim 21, wherein the card output portion includes a drying device that is adapted to dry ink that is printed on the surface of the card.

23. The printer of claim 22, wherein the drying device is selected from a group consisting of a heated roller, an ultraviolet light source, a fan, and a heater.

24. The printer of claim 21, wherein the card output portion includes a laminator.

25. The printer of claim 21, wherein the card output portion includes an embosser.

26. The printer of claim 21, wherein the card output portion includes an encoder.

27. The printer of claim 21, wherein the card output portion includes a card flipper.

28. The printer of claim 27, wherein the card flipper is adapted to receive a printed card from the transport mechanism, flip a printed card to expose a blank surface for printing, and return the card to the transport mechanism for printing on the blank surface.

29. The printer of claim 1, wherein the card includes side edges, the leading portion of the card includes a leading edge, and the printhead is adapted to print on the surface of the card at least to the side and leading edges.

30. An ink jet card printer comprising:
  an input portion including a supply of cards, each card having a surface defined by a leading edge, a trailing edge, and opposing side edges;
  an ink jet printhead adapted to print on portions of the surface of at least one card that are presented in a print position;
  a transport mechanism including a first cantilevering mechanism positioned on an input side of the print position and including upper and lower guide members that provide at least three points of support of the card at locations that are displaced from each other along the print path, wherein the upper and lower guide members are adapted to support the card in a first position in which a leading portion of the card is cantilevered through the print position for printing on the surface thereof with the printhead; and
  a controller adapted to control the input portion, the transport mechanism, and the ink jet printhead.

31. The printer of claim 30, wherein the transport mechanism includes:
  a second cantilevering mechanism positioned on an output side of the print position and adapted to support the card in a third position in which a trailing portion of the card is cantilevered through the print position for printing on the surface thereof with the printhead.

32. The printer of claim 31, wherein the first and second cantilevering mechanisms cooperate to support the card in a second position in which a middle portion of the surface is moved through the print position.

33. The printer of claim 31, wherein the second cantilevering mechanism includes at least one guide member.

34. The printer of claim 33, wherein the guide members are selected from a group consisting of a guide roller, a pair of side wheels, a grooved guide roller, a heated roller, and a conveyor belt.

35. The printer of claim 31, wherein at least one of the first and second cantilevering mechanisms includes two upper guide rollers and one lower guide roller.

36. The printer of claim 31, wherein at least one of the first and second cantilevering mechanisms includes two lower guide rollers and one upper guide roller.

37. The printer of claim 31, wherein at least one of the first and second cantilevering mechanisms includes a conveyor belt and an upper guide member, wherein the card travels between the upper guide member and the conveyor belt.

38. The printer of claim 31, wherein at least one of the first and second cantilevering mechanisms includes a pair of grooved guide wheels.

39. The printer of claim 30, including an ink over-spray collector positioned adjacent the print position and opposite the printhead and adapted to collect ink that is sprayed beyond the surface of the card.

40. The printer of claim 39, wherein the ink over-spray collector includes a trough.

41. The printer of claim 39, wherein the ink over-spray collector includes an ink-absorbing material.

42. The printer of claim 37, wherein the ink over-spray collector includes a plurality of separable layers of ink-absorbing material.

43. The printer of claim 39, wherein the ink over-spray collector includes an electrical charge that is opposite a charge of the ink that does not adhere to the card, whereby ink particulates are attracted to the ink over-spray collector.

44. The printer of claim 39, wherein the ink over-spray collector includes a plurality of projections.

45. The printer of claim 30, wherein the input portion includes a card cartridge containing the supply of cards.

46. The printer of claim 30, wherein the input portion includes a card feeder mechanism adapted to feed at least one card from the supply of cards.

47. The printer of claim 30, including a card output portion adapted to receive the card from the transport mechanism.

48. The printer of claim 47, wherein the card output portion includes a drying device that is adapted to dry ink that is printed on the surface of the card.

49. The printer of claim 48, wherein the drying device is selected from a group consisting of a heated roller, an ultraviolet light source, a fan, and a heater.

50. The printer of claim 47, wherein the card output portion includes a laminator.

51. The printer of claim 47, wherein the card output portion includes an embosser.

52. The printer of claim 47, wherein the card output portion includes an encoder.

53. The printer of claim 47, wherein the card output portion includes a card flipper.

54. The printer of claim 53, wherein the card flipper is adapted to receive a printed card from the transport mechanism, flip a printed card to expose a blank surface for printing, and return the card to the transport mechanism for printing on the blank surface.

55. A method for use with an ink jet card printer of providing full edge-to-edge printing on a surface of card, the ink jet printer including an ink jet printhead that is adapted to print on portions the surface that are presented in a print position, the method comprising steps of:

cantilevering a leading portion of the card that includes a leading edge through the print position; and printing on the surface of the leading portion of the card while it is cantilevered through the print position.

56. The method of claim 55, including a step of collecting ink that does not adhere to the card.

57. The method of claim 55 including a step of cantilevering a trailing portion of the card that includes a trailing edge through the print position.

58. The method of claim 57 including printing on the trailing portion of the card as it is cantilevered through the print position.

59. The method of claim 55 including guiding a middle portion of the card through the print position.

60. The method of claim 59 including printing on the surface of the middle portion of the card as it is guided through the print position.

61. An ink jet identification card printer comprising:

a transport mechanism including a first cantilevering mechanism positioned on an input side of a print position and adapted to support a card in a first position, in which a leading portion of the card is cantilevered through a print position; and a means for printing on portions of a surface of the leading portion of the card as it is cantilevered through the print position.

62. The printer of claim 61, wherein the transport mechanism includes a second cantilevering mechanism positioned on an output side of the print position and adapted to support the card in a third position in which a trailing portion of the card is cantilevered through the print position.

63. The printer of claim 62, wherein the first and second cantilevering mechanisms each include at least one guide member.

64. The printer of claim 63, wherein the guide members are selected from a group consisting of a guide roller, a pair of side wheels, a grooved guide roller, a heated roller, and a conveyor belt.

* * * * *

UNITED STATES PATENT AND TRADEMARK OFFICE
CERTIFICATE OF CORRECTION

PATENT NO. : 6,685,312 B2
DATED : February 3, 2004
INVENTOR(S) : Gary M. Klinefelter et al.

It is certified that error appears in the above-identified patent and that said Letters Patent is hereby corrected as shown below:

Column 10,
Line 32, after "are" insert -- adapted to support the card in a first position in which a leading portion of the card is --

Column 12,
Line 43, delete "37" and replace with -- 39 --

Signed and Sealed this

Twenty-fourth Day of August, 2004

JON W. DUDAS
*Director of the United States Patent and Trademark Office*